C. DE TONI.
CHUCK FOR STATIONARY VERTICAL DRILLING MACHINES.
APPLICATION FILED JAN. 30, 1920.

1,403,149. Patented Jan. 10, 1922.

Inventor
C. De Toni.
By H. R. Kerslake
Atty.

UNITED STATES PATENT OFFICE.

CARLO DE TONI, OF VERONA, ITALY.

CHUCK FOR STATIONARY VERTICAL DRILLING MACHINES.

1,403,149.  Specification of Letters Patent.  Patented Jan. 10, 1922.

Application filed January 30, 1920. Serial No. 355,079.

*To all whom it may concern:*

Be it known that I, CARLO DE TONI, a subject of the King of Italy, residing at Verona, in the Kingdom of Italy, have invented certain new and useful Improvements in Chucks for Stationary Vertical Drilling Machines, of which the following is a specification.

The subject-matter of the present invention is a chuck for stationary vertical drilling machines having the advantage of a large clamping-surface and releasing in vertical position without requiring any release springs.

The annexed drawings show one form of execution of the invention by way of example.

Figure 1:
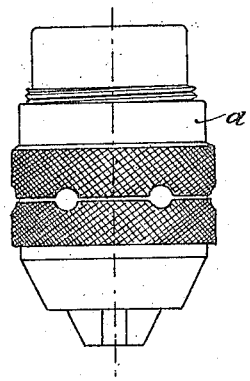
Fig. 1 is an external view showing a three jawed chuck complete in clamping position.
Figure 2:
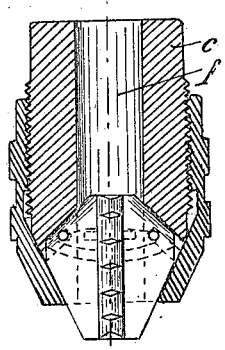
Fig. 2 is an axial section.

The chuck comprises an external cylindrical sleeve $a$, the lower portion of which is conical and fitted with a plain internal surface $b$, whereas the top portion is screw-threaded internally. The spindle $c$ is screw-treaded on the outside for engagement with the sleeve $a$, and terminates below with a trunk $d$ matching the conical bottom portion of the sleeve $a$.

In the conical portion of the spindle $c$ are formed radial recesses $m$. Three such recesses set at 120° are provided for the chuck according to the drawing. The top side of the recess is inclined upwardly and extends up to the center bore $f$ of the spindle $c$. Near the upper end of each of the recesses $m$, an upwardly extending curved slot $g$ is formed on each side of $m$, each slot being symmetrically arranged relatively to its recess $m$ and limited by upper and lower upwardly sloping parallel plane surfaces ending at a curved vertical surface $i$ which forms the inner end of the slots $g$.

The recesses $m$ are intended to receive the drill clamping jaws $l$. These jaws have practically triangular lateral faces—a vertical side of which being provided with serrations for improving the clamping action on the drill with which the vertical side has to come into contact—a downwardly sloping side $p$ converging towards the bottom end of the vertical side and having the same inclination as the conical internal surface of the sleeve $a$—and finally an upwardly sloping side $q$ converging towards the top end of the vertical side and having the same inclination as the top surface of the recess $m$. A pin or bolt $r$ projects from the two lateral faces of the jaws $l$ and is intended to engage the two slots $g$ arranged symmetrically on the two sides of $m$.

The hollow center spindle $c$ is secured to the machine and the sleeve $a$ serves to bring the clamping jaws $l$ into released or closed position.

Figure 3:
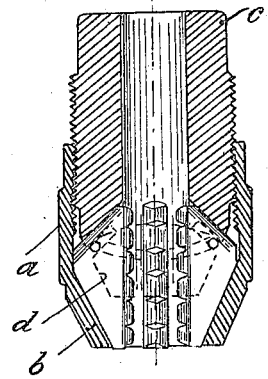
Fig. 3 is an axial section of the chuck complete in released position.
Figure 4:
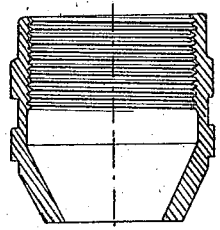
Fig. 4 shows the outside sleeve in section.
Figure 5:
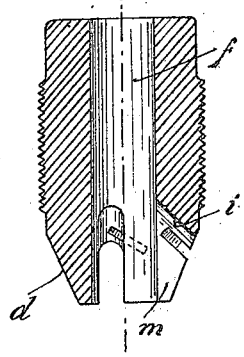
Fig. 5 is a section showing the hollow central spindle with the clamping jaws removed.
Figure 6:
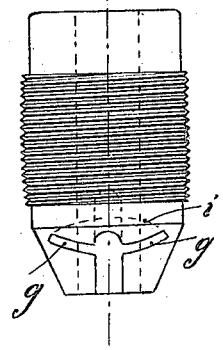
Fig. 6 shows the said center spindle as seen when facing one of the recesses in which the clamping jaws are lodged.
Figure 7:
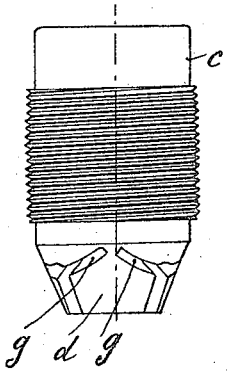
Fig. 7 is a similar view taken at 60° with respect to that of Fig. 6.
Figures 8, 9:
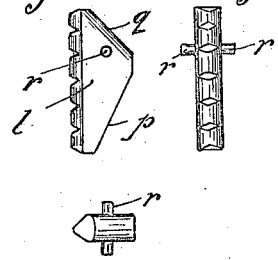
Figures 8, 9 and 10 are side, front and plan views respectively of a clamping jaw.
Figure 10:

When the chuck is at rest with the clamping jaws released (Fig. 3), the drill can be inserted in the space left between the vertical sides of the jaws $l$. Thereupon, the sleeve is screwed upon the center spindle whereby the jaws are brought nearer to one another. During this motion each jaw is guided by the two projecting pin ends $r$ engaging the curved slots $g$.

Having now particularly described and ascertained the nature of my said invention and in what manner the same is to be used, what I claim, and desire to secure by Letters Patent, is:—

A self centering chuck for stationary vertical drilling machines comprising a cylindrical body member having external screw threads and a central bore, the lower end of said body member being frusto-conically shaped, vertical radial recesses provided in the lower end of said body member and having upper walls inclined upwardly and inwardly from the outer surface of the body member to the central bore, the body member being provided with slots which extend laterally from each of said recesses and the walls of said slots extending from the outer surface of the body member upwardly and inwardly toward the bore, jaw members cooperating with said recesses and slots and each including a substantially triangular-shaped member having its base serrated, pins extending from the opposite sides of each jaw and slidably engaging the slots on opposite sides of a recess, and a sleeve having internal threads engaging the external threads of the body member, said sleeve having a frusto-conical internal surface designed to engage the jaws for raising the same when the sleeve is moved upwardly.

Signed at Milan (Italy), this 9th day of January 1920.

CARLO DE TONI.